United States Patent [19]
Ruault et al.

[11] Patent Number: 5,671,291
[45] Date of Patent: Sep. 23, 1997

[54] PROCESS AND DEVICE FOR CHARACTER RECOGNITION, IN PARTICULAR FOR STANDARDIZED CHARACTER TYPE E-13B

[75] Inventors: Jean-Philippe Ruault, Versailles; Richard Besson, Voisin Le Bretonneux, both of France

[73] Assignee: Dassault Automatismes et Telecommunications, Plaisir Cedex, France

[21] Appl. No.: 379,783

[22] Filed: Jan. 27, 1995

[30] Foreign Application Priority Data

Feb. 3, 1994 [FR] France ................... 9401232

[51] Int. Cl.$^6$ ........................... G06K 9/00
[52] U.S. Cl. ........................ 382/139; 382/137
[58] Field of Search ................. 382/137–139, 382/182, 184

[56] References Cited

U.S. PATENT DOCUMENTS 4,143,356  3/1979  Nally .............................. 382/139
4,245,211  1/1981  Kao ................................ 382/139
4,590,606  5/1986  Rohrer ............................ 382/137

OTHER PUBLICATIONS

"Sequential MICR Character Recognizer" In: Research Disclosure, No. 269, Sep. 1986, Havant GB, p. 257.

R. Ordower et al: "Character Recognition by Continuous Time Domain Comparison". In: IBM Technical Disclosure Bulletin, vol. 10, No. 4, Sep. 1967, New York US, pp. 380–381.

Primary Examiner—Leo Boudreau
Assistant Examiner—Chris Kelley
Attorney, Agent, or Firm—Spencer & Frank

[57] ABSTRACT

A wave form representative of the character to be recognized is converted digitally. For each set of N sample reference signals initially acquired, the absolute value of the difference between the numerical value of each sample reference signal and the numerical value of each sample signal to be recognized is calculated in order to establish K lists each of N absolute values. From the K lists is selected that for which the N absolute values have an approximately constant value, where the character to be recognized corresponds to the reference character associated with the list thus selected.

10 Claims, 7 Drawing Sheets

| |
|---|
| Vabs0 (1) = [(Vx(1)-Vréf0(1))] = 1 |
| Vabs0 (2) = 1 |
| Vabs0 (3) = 1 |
| Vabs0 (4) = 1 |
| Vabs0 (5) = 1 |
| Vabs0 (6) = 1 |
| Vabs0 (7) = 1 |
| Vabs0 (8) = 1 |
| Vabs0 (9) = 1 |
| Vabs0 (10) = 1 |
| Vabs0 (11) = 1 |
| Vabs0 (12) = 0 |

FIG.5A

| |
|---|
| Vabs1 (1) = [(Vx(1)-Vréf0(1))] = 1 |
| Vabs1 (2) = 0 |
| Vabs1 (3) = 0 |
| Vabs1 (4) = 4 |
| Vabs1 (5) = 7 |
| Vabs1 (6) = 10 |
| Vabs1 (7) = 2 |
| Vabs1 (8) = 1 |
| Vabs1 (9) = 7 |
| Vabs1 (10) = 4 |
| Vabs1 (11) = 1 |
| Vabs1 (12) = 0 |

FIG.5B

PROCESS AND DEVICE FOR CHARACTER RECOGNITION, IN PARTICULAR FOR STANDARDIZED CHARACTER TYPE E-13B

BACKGROUND OF THE INVENTION

1. Field of the Invention

The present invention concerns the recognition of characters, in particular recognition of standardized characters type E-13B.

2. Description of the Related Art

Character recognition is applied in the processing of documents such as bank check, certificates or similar documents which are coded and printed in magnetic ink. For example, an MICR (Magnetic Ink Character Recognition) line is printed on bank checks. An MICR line comprises for example a number forming an amount, a bank number and a check number.

Character recognition devices are already known, in particular for standardized characters type E-13B, which comprise:

scanning means for scanning a character to be recognized in order to obtain a wave form representative of the character to be recognized, and processing means for processing the resulting wave form in order to identify the character to be recognized.

Such devices have the disadvantage of being dependent on faults in the character printing which can prevent correct identification of the characters.

SUMMARY OF THE INVENTION

The present invention remedies this disadvantage.

Thus one aim of the invention is to improve the processing of the wave form of the character to be recognized in order to identify it correctly in the presence of poor quality printing on the document to be processed.

Another aim of the invention is to provide a character recognition device intended to be easily and cheaply installed in a processing chain for documents such as bank checks.

The present invention concerns a character recognition process, in particular for standardized characters E-13B, comprising the following stages:

a) scanning a character to be recognized in order to obtain a wave form representative of the character to be recognized, and b) processing the resulting wave form in order to identify the character to be recognized.

In a general definition of the invention, stage b) comprises the following stages:

b1) sampling the resulting wave form at a predetermined frequency in order to supply N sampled signals to be recognized;

b2) determining and storing the numerical value corresponding to the amplitude of each sampled and supplied signal to be recognized;

b3) initially acquiring K sets of N sampled reference signals, K being the number of reference characters;

b4) determining and storing the numerical value corresponding to the amplitude of each sampled reference signal thus acquired initially;

b5) for each set of N sampled reference signals, calculating the absolute value of the difference between the numerical value of each sampled reference signal and the numerical value of each sampled signal to be recognized in order to establish K lists each of N absolute values; and b6) from the K lists, selecting that for which the N absolute values have an approximately constant value within the list, the character to be recognized corresponding to the reference character associated with the list thus selected.

A further aim of the invention is a device for the implementation of the above procedure, which comprises:

scanning means for scanning a character to be recognized in order to obtain a wave form representative of the character to be recognized, and processing means for processing the resulting wave form in order to identify the character to be recognized.

In a general definition of the invention, the processing means comprise:

sampling means for sampling the resulting wave form at a predetermined frequency in order to supply N sampled signals to be recognized;

first means of determining and storing the numerical value corresponding to the amplitude of each sampled and supplied signal to be recognized;

acquisition means for acquiring K sets each of N sampled reference signals, K being the number of reference characters;

second means of determining and storing the numerical value corresponding to the amplitude of each sampled reference signal thus acquired initially;

calculation means for calculating, for each set of N sampled reference signals, the absolute value of the difference between the numerical value of each sampled reference signal and the numerical value of each sampled signal to be recognized in order to establish K lists each of N absolute values, and selection means for selecting, from the K lists, that for which the N absolute values have an approximately constant value within the list, the character to be recognized corresponding to the reference character associated with the list thus selected.

BRIEF DESCRIPTION OF THE DRAWINGS

Other characteristics and advantages of the invention will appear in the light of the detailed description below and the associated drawings in which:

FIG. 5A illustrates the list associated with the reference character 0 obtained by calculation of the absolute value of the difference between the numerical value of each sampled signal of the reference character 0 and the numerical value of each sampled signal to be recognized according to the invention;

FIG. 5B illustrates the list associated with the reference character 1 obtained by calculation of the difference between the numerical value of each sampled signal of the reference character 1 and the numerical value of each sampled signal to be recognized according to the invention.

DETAILED DESCRIPTION OF THE PREFERRED EMBODIMENT

In the description below, the process and the device for character recognition according to the invention are described in the application of a bank check reader. This description is intended to facilitate comprehension of the invention. It is not a limitation of the invention insofar as this is generally applicable in the processing of all documents with standardized characters, in particular characters of type E-13B.

Figure 1:
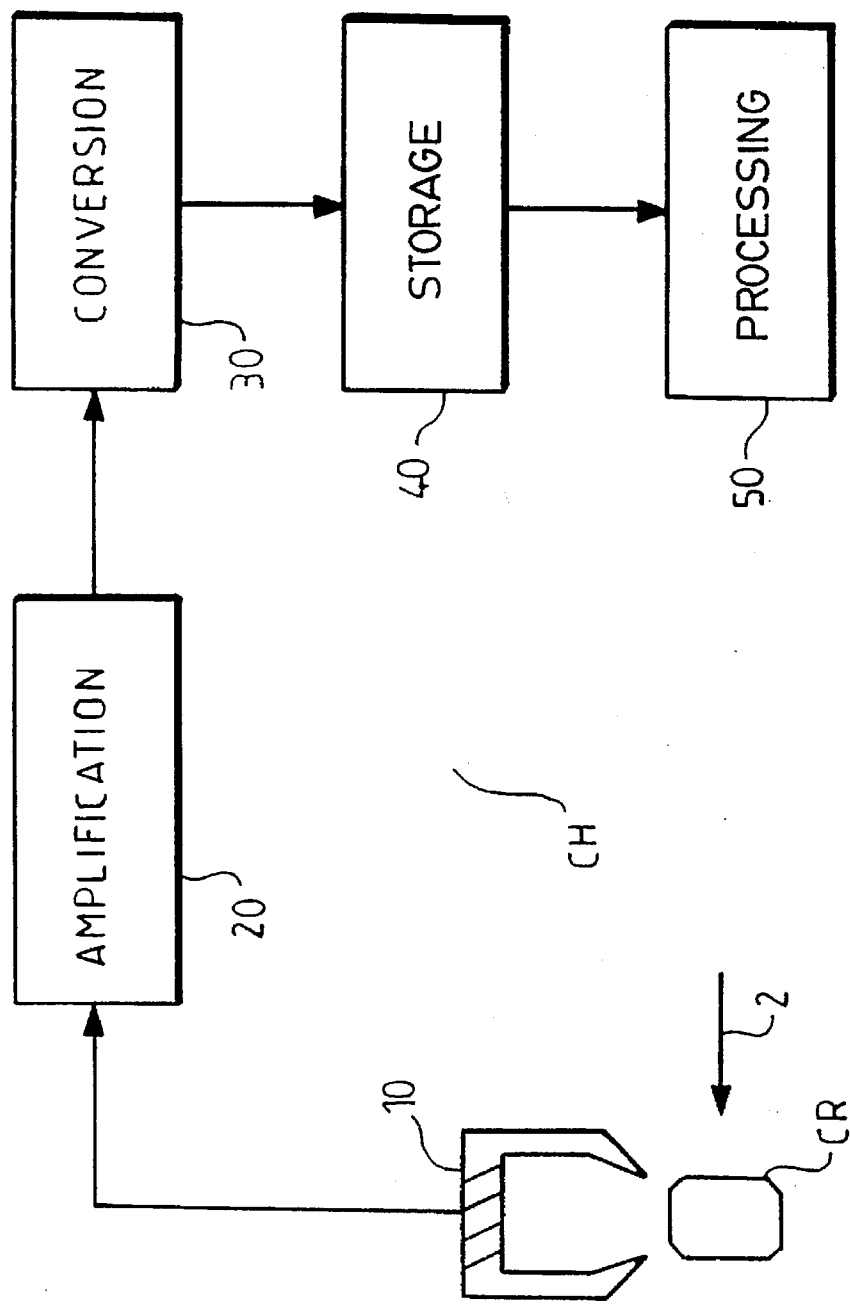
FIG. 1 is a diagram showing the processing chain for E-13B characters according to the invention.

FIG. 1 shows a recognition chain CH for standardized characters of type E-13B printed on a bank check. The first link in this chain is that relating to the movement of the bank check.

The check is moved in its longitudinal direction at a constant speed, for example a speed of the order of 0.47 m/s in the case where it is moved by stepped motors as in the check reader sold by the assignee under the reference ETC 502.

Arrow 2 illustrates the movement of the character CR in front of the magnetic read head 10.

The second link 20 of the processing chain CH is that relating to obtaining the wave form representative of the character to be recognized.

The movement of the character CR in front of the magnetic read head 10 causes generation of an analog electrical signal corresponding to the temporal derivative of the change occurring in the flux of the magnetized ink. This signal is represented by the analog signal AG of FIG. 2. The analog signal AG is transmitted by the read head 10 to means of shaping the analog signal 20.

These shaping means 20 comprise an amplification chain capable of amplifying the analog signal in an appropriate scale. This amplification chain is followed by filtration means (not shown) capable of eliminating the useless frequencies.

Although the character CR is printed with magnetic ink according to the E-13B character policy adopted by the American Banker Association, it is clear that the recognition device according to the invention may be used with any other character policy giving rise to an individual analog signal during reading by the magnetic read head 10.

In practice, the character to be recognized is read using magnetization obtained by a permanent magnet followed by detection of the variation of the magnetic flux obtained by a magnetic head, or using a measurement of the variation in reluctance obtained by a magnetic head.

As a variant, the magnetization may be obtained by a continuous current supply to the magnetic head.

The means of amplification have for example an amplification gain of the order of 1200 for the speed mentioned above. The means of filtration have for example a cut-off frequency of the order of 6 kHz.

The analog signal from means 20 is sampled at a predetermined frequency (for example of the order of 12.5 kHz) by means of sampling and analog/digital conversion 30.

Insofar as the standardized characters type E-13B do not, at the speed of movement of the check mentioned above, generate rapid variations in the signal to be processed (maximum frequencies less than 1 kHz), the analog/digital converter is not necessarily fast.

In practice, the sampling period is of the order of 80 microseconds and the conversion time is less than 40 microseconds, which allows sampling of the order of 75 samples per character.

The bits resolution of the conversion is for example 8 bit.

The numerical value of the signals sampled is stored in memory 40, for example in a volatile type memory. For example, the capacity of memory 40 is of the order of 4 to 32K octets.

It should be noted that due to the reduced number of samples and the low resolution necessary for sampling the check, low capacity memories can be used and an entire line E-13B stored in one pass.

Finally, the character recognition chain comprises processing means 50 capable of processing the numerical data thus obtained according to a character recognition algorithm which will be described in detail below.

Essentially, the processing means are based on a rudimentary, inexpensive microprocessor or microcontroller very commonly found in small automated systems.

For example, as in check reader ETC 502, the processing means comprise an 8-bit micro-controller sold by the company INTEL under reference 8051 with an external clock with frequency 18 MHz.

In general, the character recognition process according to the invention comprises a learning phase, a storage phase and a decoding phase.

The purpose of the learning phase is to memorize the reference characters of standard E-13B which will serve as reference during subsequent recognition phases.

After passage of the check in front of the magnetic head and sampling of the wave form obtained, as described with reference to FIG. 1, the reference characters of an E-13B line are stored in the memory 40 in the form of numerical values.

Figure 4A:
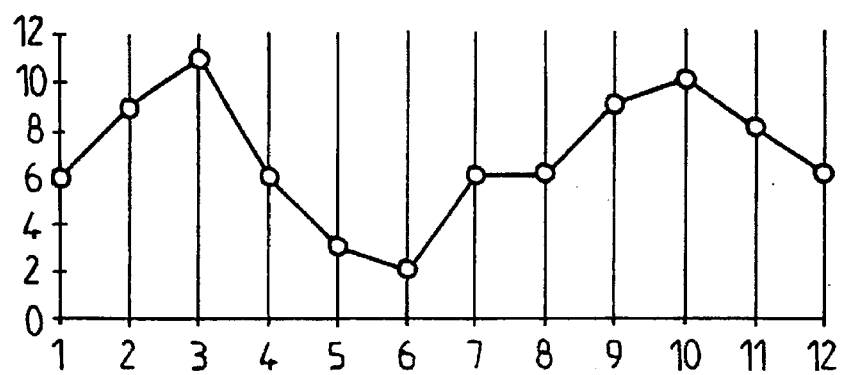
FIG. 4A illustrates the determination and storage of the numerical value corresponding to the amplitude of each sampled signal of reference character 0.

FIG. 4A shows a set marked Vref0 of N sampled signals of a reference character 0, where N here is equal to 12. For example, the first sample has a numerical value equal to 6 corresponding to the amplitude of sample 1. Similarly, sample no. 2 has a numerical value equal to 9 corresponding to the amplitude of the sample No. 2.

Figure 4B:
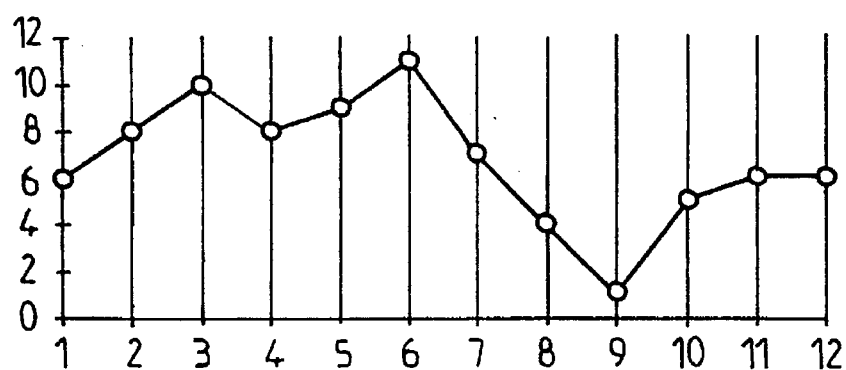
FIG. 4B illustrates the determination and storage of the numerical value corresponding to the amplitude of each sampled signal of reference character 1.

FIG. 4B shows a set marked Vref1 of 12 sampled signals of a reference character 1.

Advantageously, the learning phase also comprises a stage of centering the character, during which all numerical values of the sampled signals of the reference characters are assessed. From all these sampled values, at least two successive samples are then isolated with respective values greater than a predetermined threshold S.

Figure 2:
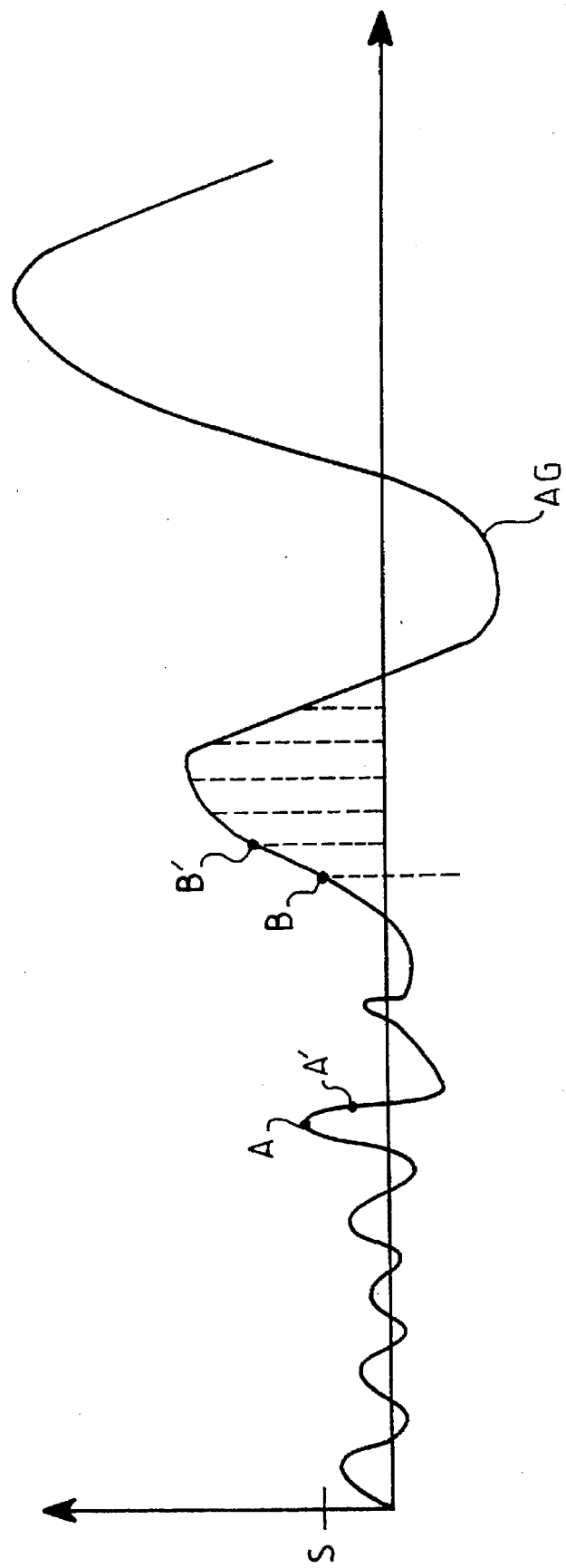
FIG. 2 is a chronogram illustrating the analog wave form obtained according to the invention.

For example, as described with reference to FIG. 2, the successive samples B and B' are isolated as each has a level greater than S, whereas successive samples A and A' are rejected as A' has a level less than S.

This method allows not only elimination of noise and parasitic signals (sample signals A and A'), but above all obtains a decoding window for N samples in which the character is defined. This decoding window advantageously allows the character recognition to be centered on the useful signals.

As will be seen in more detail below, this decoding window is used in the learning phase, the storage phase and the decoding phase.

It should be noted that thresholding over two successive samples has proved satisfactory to eliminate parasitic signals and determine the useful samples for character definition. Naturally in other applications, the thresholding may be established over more than two successive samples.

Advantageously, after the character centering operation, the mean value of the numerical value of each sample is calculated over several acquisitions until the data calculated has stabilized. On completion of this smoothing operation, a smooth signal is obtained which represents the reference character.

Finally, the signal thus smoothed is stored in a non-volatile memory (not shown).

Thus, in this non-volatile memory is stored the numerical value corresponding to the amplitude of each sampled reference signal supplied on completion of the learning operations mentioned above (including centering and smoothing), which allows initial acquisition of K sets each of N sampled reference signals, where K is the number of reference characters and N the number of samples per character.

These reference data are defined by the term VrefK(i), where i varies from 1 to N.

For its part, the phase of storing the character to be recognized comprises the operations of movement of the check 10, numerical acquisition 20, 30, 40, and the operation for centering the character as described above. On completion of these operations, N numerical values are obtained corresponding to the amplitude of each sampled signal to be recognized.

Figure 4C:
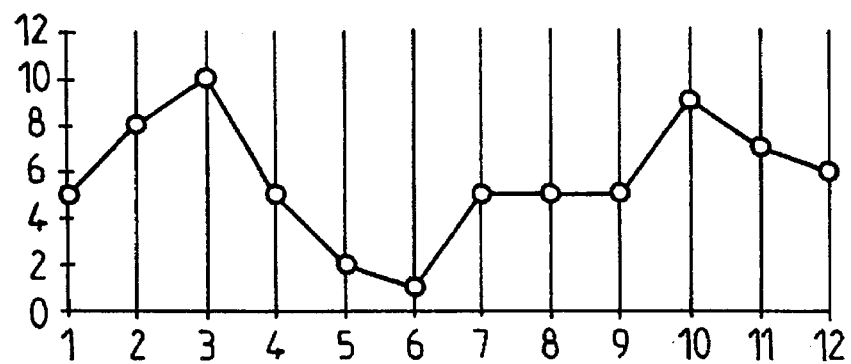
FIG. 4C illustrates the determination and storage of the numerical value corresponding to the amplitude of each sampled signal of the character to be recognized.
Figure 6:
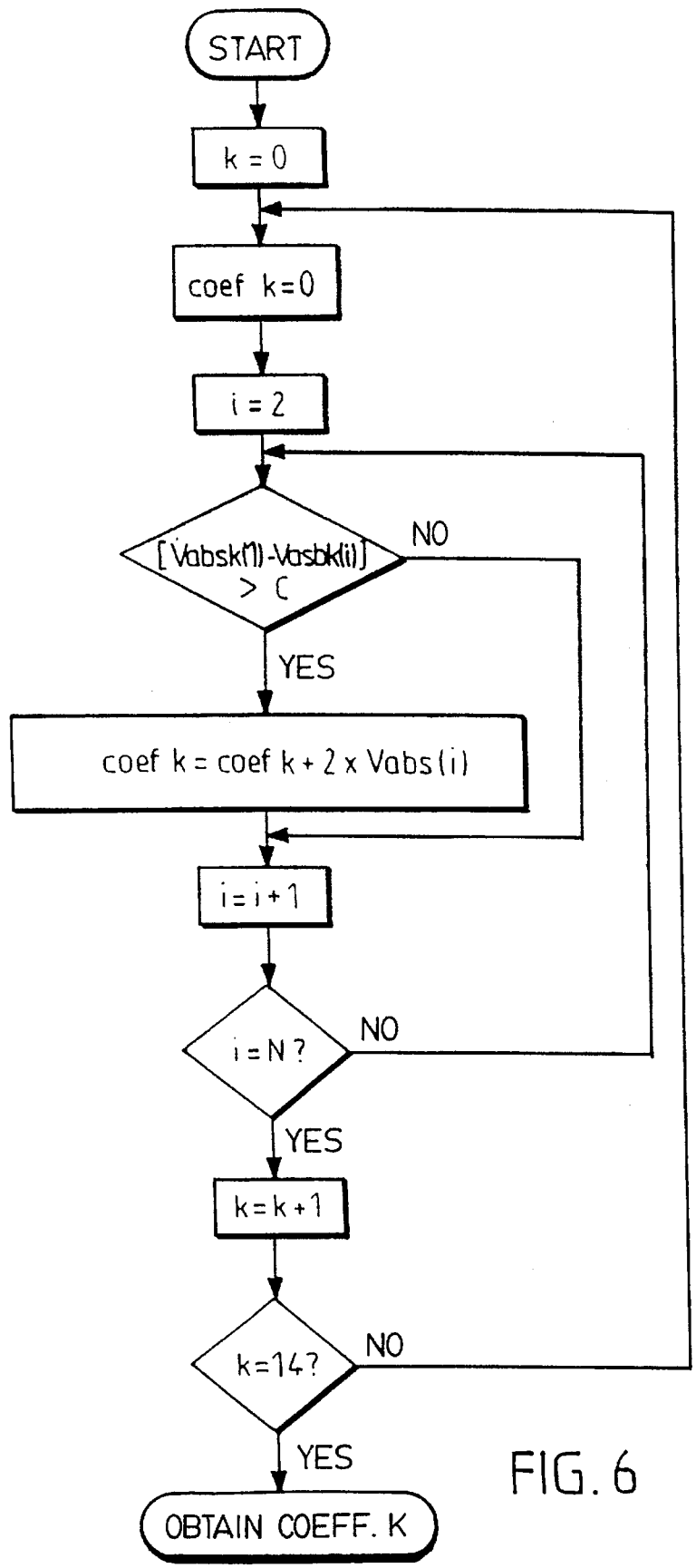
FIGS. 6 and 7 are flowcharts which illustrate the selection from the K lists of that having the N absolute values with a value approximately constant within the said list according to the invention.

FIG. 4C shows the N numerical values of the signal Vx to be recognized, with N equal to 12 samples.

For example, sample No. 1 of signal Vx has a numerical value equal to 5. Sample No. 2 has a numerical value equal to 8.

Once obtained, values Vx are stored in a volatile memory in the same way as the signals Vref obtained before during the learning operation before their storage in the non-volatile memory.

It should be noted that the storage operation associated with the character to be recognized does not include the smoothing operation.

The character recognition algorithm according to the invention uses the data resulting from the learning and storage associated with the character to be recognized, to identify the character to be recognized.

Figure 3:
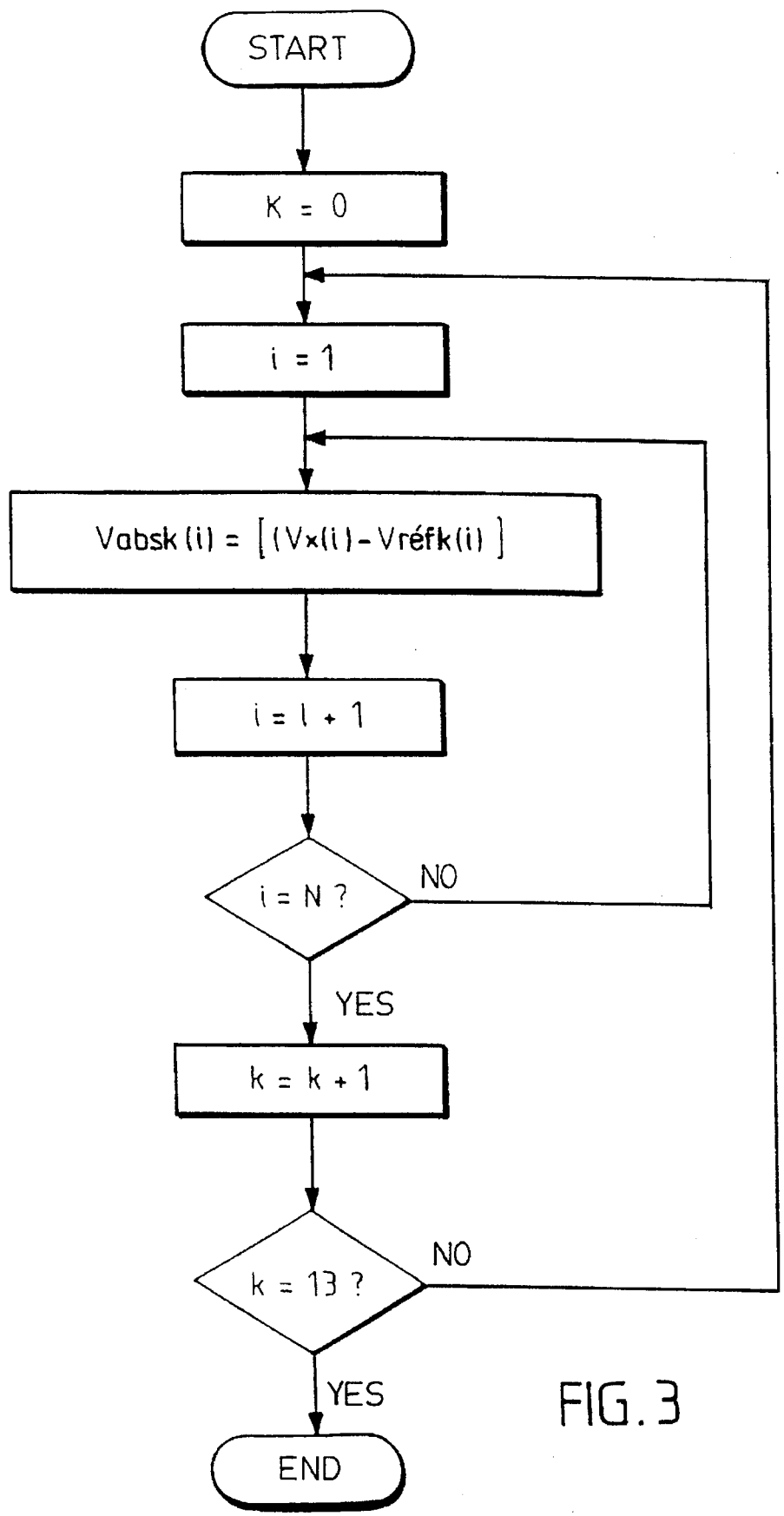
FIG. 3 is a flowchart illustrating the calculation of the absolute value of the difference between the numerical value of each sampled reference signal and the numerical value of each sampled signal to be recognized according to the invention.

As described with reference to FIG. 3, the algorithm comprises the calculation, for the K sets each of N sampled reference signals, of the absolute value of the difference between the numerical value of each sampled reference signal and the numerical value of each sampled signal to be recognized, i.e.:

$$Vabs\ K(i) = |Vx(i) - Vref\ K(i)|$$

with i variant from 1 to N and K variant here from 0 to 13.

This calculation allows the establishment of K lists each of N absolute values.

FIG. 5A shows the list of an example of absolute values associated with the reference character 0, with N equal to 12 samples.

Similarly, FIG. 5B shows the list of an example of absolute values associated with the reference character 1, with N equal to 12 samples.

The list in FIG. 5A may be represented by a discrete curve relating to an equation of type $F(X)=1$, i.e., a constant, whereas the second list (FIG. 5B) has discontinuities which, as will be seen in more detail below, allow the conclusion that the character to be recognized does not correspond to the reference character 1 associated with this second list.

The invention consists of selecting from the K lists that for which the N absolute values have an approximately constant value within the list. This selection advantageously allows for printing faults in characters on the checks.

As seen above, the first sample of signal Vx (here sample B, FIG. 2) corresponds to the start of the character to be recognized thanks to the centering program described above.

The Applicant has surprisingly found that the differences in absolute values associated with the subsequent samples of sample B must be approximately equal to that of sample B in order to consider that the character to be recognized corresponds to the reference character associated with the list of absolute values thus analyzed. In practice, to verify that the differences in absolute values are approximately equal to the first value obtained, the invention provides a calculation according to the equation I (in the Appendix).

If the result in equation I is strictly greater than a predetermined constant C, the sum of the divergent absolute values is calculated to obtain a coefficient of resemblance COEFK. However, if the result of equation I is less than or equal to the predetermined constant C, the data being studied remains close to the absolute value corresponding to the first sample, which means that the signal Vx resembles signal Vref.

In practice, constant C is not zero as the amplification chain is not perfect. For example, with the data described with reference to FIGS. 4A and 4B, and with a constant C equal to 1, we find the sum COEF0 associated with reference character 0 equal to 0 and the sum COEF1 associated with reference character 1 equal to 27.

Advantageously, in order to separate the coefficients of resemblance COEFK, the absolute values may be multiplied by a predetermined factor, for example 2, when the test in equation I is greater than constant C, before adding them. Thus, in the example mentioned above, sum COEF0 is equal to 0 and sum COEF1 is equal to 54.

Figure 7:
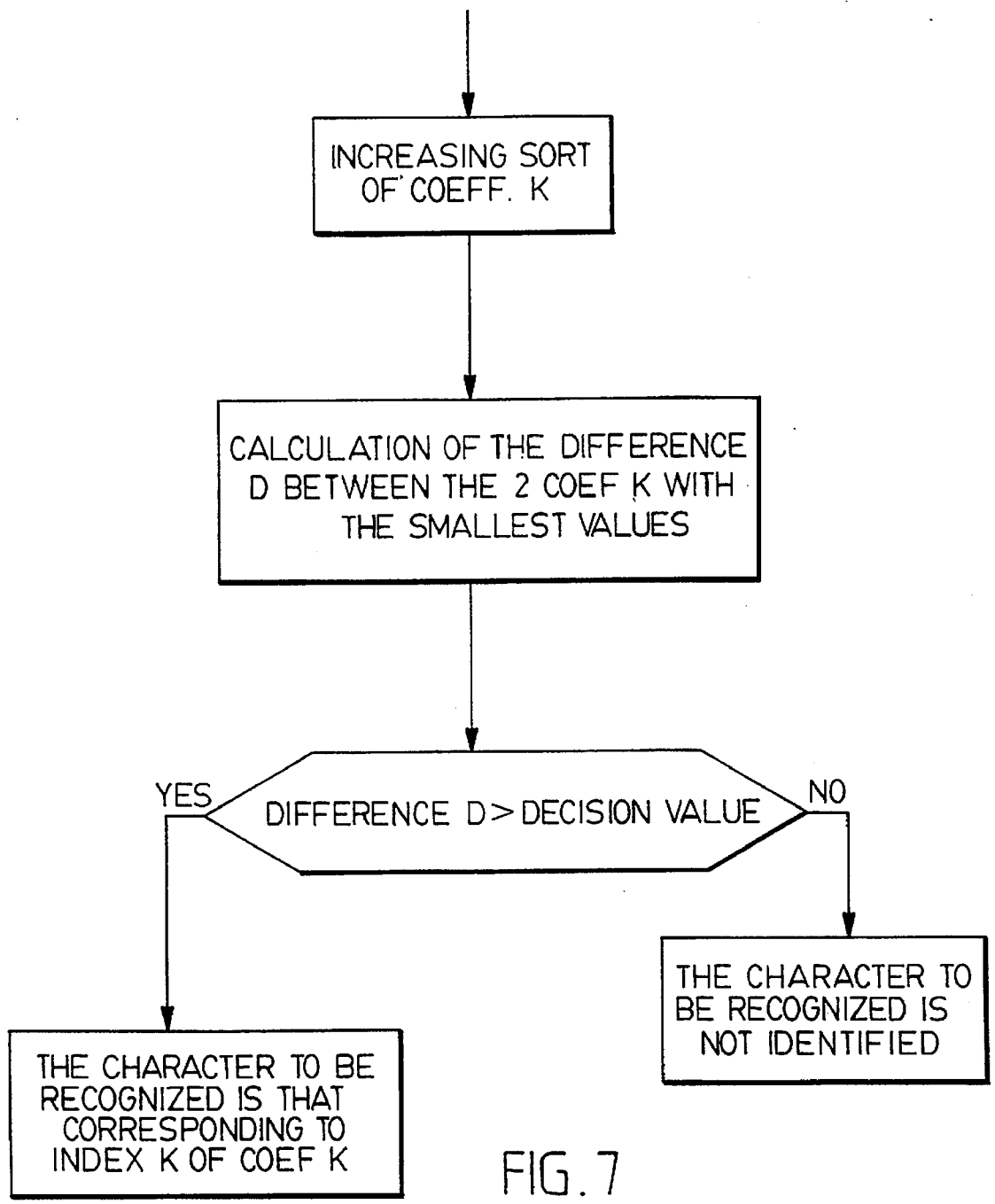

Finally, the last recognition operation (FIG. 7) consists firstly of carrying out an increasing sort of sums COEFK thus obtained for each of the K lists. Then, the two smallest sums are selected. Finally, to determine the character being studied, the difference D between these two smallest sums is determined. If this difference D is greater than a predetermined decision value, the character being decoded is equal to index k of the smallest sum COEFK. In the example mentioned above, the character to be recognized is reference character 0.

If the decision value is equal, for example, to 15, the FIG. 0 may be considered as the character to be recognized. However, if this difference is less than the decision value, it is difficult to affirm that a character has been decoded, in which case a question mark is displayed rather than an error.

It should be noted that the decision value is determined empirically with several attempts. Also, the fact of taking the two smallest values of the sums and not the single smallest value is a point allowing authentication of the recognition.

Also, in the case of non-decoding, the character can be recentered and decoded again as described above, where applicable with modification of certain parameters such as the threshold S, the number of samples N, the coefficients of resemblance, the decision value, etc.

APPENDIX I

I—|Vabs K(1)–Vabs K(i)|

We claim:

1. A method for character recognition comprising the steps of:

in a learning phase:
scanning K reference characters for obtaining K waveforms which are respectively representative of the K reference characters;
sampling the K waveforms at a predetermined sampling frequency for obtaining N sampled signals for each of the K reference characters;
determining a numerical value corresponding to an amplitude for each of the N sampled signals of each of the K reference characters;
storing the numerical values corresponding to the respective amplitudes of each of the N sampled signals of each of the K reference characters;

in a storage phase:
scanning a character to be recognized for obtaining a waveform which is representative of the character to be recognized;
sampling the waveform representing the character to be recognized at the predetermined sampling frequency for obtaining N sampled signals of the character to be recognized;
determining a numerical value corresponding to an amplitude of each of the N sampled signals of the character to be recognized;
storing the numerical value corresponding to the amplitude of each of the N sampled signals of the character to be recognized;

in a decoding phase:
calculating an absolute value of a difference between the numerical value for each of the N sampled signals of the character to be recognized and a corresponding numerical value of each of the N sampled signals of each of the K reference characters, for establishing K lists, each list having N absolute values and being associated with a unique reference character; and
selecting a list from the K lists based on the absolute values of the selected list having an approximately constant value within the selected list, the character to be recognized being determined to be the reference character associated with the selected list, and wherein the method further comprises, in the learning phase, the steps of:
assessing the numerical values of the N sampled signals of each of the K reference character signals; and
isolating from the N assessed numerical values of each reference character at least two successive numerical values which are greater than a predetermined threshold for obtaining a decoding window for each of the K reference characters.

2. The method according to claim 1, wherein the character to be recognized is a standardized character type E-13B.

3. The method according to claim 1, further comprising in the decoding phase, the steps of:
assessing the numerical values of the N sampled signals of the character to be recognized; and
isolating from the N assessed numerical values at least two successive numerical values of the N sampled signals of the character to be recognized which are greater than a predetermined threshold for obtaining a decoding window for the character to be recognized.

4. A method for character recognition comprising the steps of:

in a learning phase:
scanning K reference characters for obtaining K waveforms which are respectively representative of the K reference characters;
sampling the K waveforms at a predetermined sampling frequency for obtaining N sampled signals for each of the K reference characters;
determining a numerical value corresponding to an amplitude for each of the N sampled signals of each of the K reference characters;
storing the numerical values corresponding to the respective amplitudes of each of the N sampled signals of each of the K reference characters;

in a storage phase:
scanning a character to be recognized for obtaining a waveform which is representative of the character to be recognized;
sampling the waveform representing the character to be recognized at the predetermined sampling frequency for obtaining N sampled signals of the character to be recognized;
determining a numerical value corresponding to an amplitude of each of the N sampled signals of the character to be recognized;
storing the numerical value corresponding to the amplitude of each of the N sampled signals of the character to be recognized;

in a decoding phase:
calculating an absolute value of a difference between the numerical value for each of the N sampled signals of the character to be recognized and a corresponding numerical value of each of the N sampled signals of each of the K reference characters, for establishing K lists, each list having N absolute values and being associated with a unique reference character; and
selecting a list from the K lists based on the absolute values of the selected list having an approximately constant value within the selected list, the character to be recognized being determined to be the reference character associated with the selected list, wherein the step of selecting comprises the steps of:
determining a particular absolute value for each of the K lists of absolute values having a value which diverges from the absolute value of a first sample of the character to be recognized;
sorting the sum results by increasing value; and
selecting a character to be recognized corresponding to the reference character associated with the particular sum result, the selected sum result being less than a predetermined constant.

5. The method according to claim 4, wherein the character to be recognized is a standardized character type E-13B.

6. A method for recognizing an unknown character, comprising the steps of:

(a) generating a sequence of N sampled values for the unknown character, step (a) including:
(a-1) scanning the unknown character to obtain a waveform, (a-2) sampling the waveform at a predetermined sampling frequency, and (a-3) determining numerical values for the samples;

(b) matching the unknown character with one of K reference characters so as to recognize the unknown character, each of the K reference characters being represented by a stored sequence of N sampled values for the respective reference character, step (b) including:

(b-1) calculating a sequence of N absolute values of differences between the sampled values of the sequence for the unknown character and the sampled values in the stored sequence for a first one of the reference characters, and additionally calculating a sequence of N absolute values of differences between the sampled values of the sequence for the unknown character and the sampled values in the stored sequences for another of the reference characters, and repeating until sequences of absolute values have been calculated for all K reference characters;

(b-2) after sequences of absolute values have been calculated for all K reference characters, recognizing the unknown character as said first one of the reference characters if the N absolute values in the sequence are approximately equal, and recognizing the unknown character as a second one of the reference characters if said first one of the reference characters is not recognized as the unknown character and if the absolute values in the sequence of N absolute values for said second one of the reference characters are approximately equal; and (b-3) calculating a resemblance coefficient for each of the reference characters if the absolute values are approximately equal in none of the sequences of N absolute values, the resemblance coefficient being a function of the sum of the absolute values in the sequence of N absolute values for the respective reference character, and using the resemblance coefficients to recognize the unknown character.

7. The method according to claim 6, wherein the unknown character is a standardized character type E-13B.

8. The method according to claim 6, wherein the waveform of the unknown character has an amplitude, wherein step (a-2) is conducted by sampling the amplitude of the waveform, wherein the N sampled values in the sequence for the unknown character are amplitude values, and wherein the N sampled values in the stored sequences for the reference characters are amplitude values.

9. The method according to claim 8, wherein N is an integer around 12.

10. The method according to claim 6, further comprising the step of conducting a learning phase to ascertain and store the sequences of sampled values for the K reference characters.

* * * * *